United States Patent [19]

Murphy et al.

[11] Patent Number: 5,335,777
[45] Date of Patent: Aug. 9, 1994

[54] METHOD AND APPARATUS FOR BELT CONVEYOR LOAD TRACKING

[75] Inventors: Christopher J. Murphy, Ann Arbor; Ronald E. Bliss, Ypsilanti, both of Mich.

[73] Assignee: Jervis B. Webb Company, Farmington Hills, Mich.

[21] Appl. No.: 137,846

[22] Filed: Oct. 15, 1993

[51] Int. Cl.$^5$ .............................................. B65G 43/00
[52] U.S. Cl. ............................. 198/502.3; 198/349.8; 198/349.95
[58] Field of Search .............. 198/502.3, 349.8, 349.95

[56] References Cited

U.S. PATENT DOCUMENTS

| | | |
|---|---|---|
| 2,880,891 | 4/1959 | Carroll . |
| 2,990,965 | 7/1961 | Smoll et al. . |
| 3,000,519 | 9/1961 | Purnell . |
| 3,252,595 | 5/1966 | Collins et al. . |
| 3,587,856 | 6/1971 | Lemelson . |
| 3,648,838 | 3/1972 | Hiromura . |
| 3,709,381 | 1/1973 | Sullivan et al. . |
| 3,752,312 | 8/1973 | Soltanoff . |
| 3,785,510 | 1/1974 | Grooteboer . |
| 3,786,939 | 1/1974 | Habegger et al. . |
| 3,799,365 | 3/1974 | Sullivan et al. . |
| 3,849,633 | 11/1974 | Reirboeck et al. . |
| 3,915,284 | 10/1975 | Knockeart et al. . |
| 3,955,678 | 5/1976 | Moyer . |
| 4,181,947 | 1/1980 | Krauss et al. . |
| 4,239,434 | 12/1980 | Gannon . |
| 4,249,661 | 2/1981 | Lem . |
| 4,501,365 | 2/1985 | Peyton et al. . |
| 4,542,808 | 9/1985 | Lloyd, Jr. et al. . |
| 4,776,464 | 10/1988 | Miller et al. . |
| 4,915,209 | 4/1990 | Canziani . |

FOREIGN PATENT DOCUMENTS

| | | | |
|---|---|---|---|
| 0249812 | 10/1987 | Japan ............................... | 198/502.3 |
| 0214512 | 8/1989 | Japan ............................... | 198/502.3 |
| 1475872 | 4/1989 | U.S.S.R. ........................... | 198/502.3 |

*Primary Examiner*—Cheryl L. Gastineau
*Attorney, Agent, or Firm*—Joseph W. Farley

[57] ABSTRACT

A method of and apparatus for tracking data associated with a load being conveyed on a belt conveyor between a source station including a source station load sensor and a destination station including a destination station load sensor includes the steps of: generating a data record for the load at the source station, loading the data record into a programmable controller for controlling the conveyor, generating a pulse signal having a number of pulses directly proportional to the travel of the belt conveyor, establishing an expectation window indicating expected arrival of the load at the destination station, establishing a distance field for the load using the smaller of the distance between the load and any preceding load on the belt conveyor or the distance between the load and the destination load sensor, sensing the leading edge of the load by the destination station load sensor, comparing the distance between the source and destination load sensors and detecting any slippage of the load on the belt and updating the data record in the controller based on the detected load slippage to coincide with the actual position of the load on the conveyor at the destination station.

20 Claims, 3 Drawing Sheets

METHOD AND APPARATUS FOR BELT CONVEYOR LOAD TRACKING

TECHNICAL FIELD

This invention relates to a belt conveyor load tracking system for tracking a load between processing stations and more particularly to a system for maintaining synchronization between a load data record associated with the load and the load as it is being transported by accommodating for any slippage of the load on the belt conveyor as it is being transported.

BACKGROUND ART

In the fields of material handling and industrial processing, automated equipment is used to transport loads automatically through various processing steps. As the load moves on the transportation system, it is often necessary to associate data with the load which cannot be done by applying the data to the load and by examining the load with sensors to retrieve the data. Examples of this kind of information are date of manufacture, processing steps required, ownership of the load, and cost of the load.

A typical industrial system consists of transportation elements, processing elements, operator interface elements, and data processing elements. These elements are typically arranged in a distributed and/or hierarchical manner. One conventional system consists of at least one source processing station and one destination processing station and a conveyor between the stations. In such a system each of the processing stations has an independent controller and the conveyor is independently controlled.

The source station produces loads which are carried by the conveyor to the destination station. The operation at the destination station on a particular load depends on information about the load produced by the source station. This information must be presented to the destination station synchronized with the arrival of the load. This requires intensive, dynamic processing of the data handled for each load.

There are some problems associated with this synchronization requirement. The conveyor system must maintain synchronization for all of the loads in its domain simultaneously. The conveyor system must tolerate sensor errors so as to maintain synchronization. The system must also tolerate human errors, such as the removal of a load from the middle of the conveyor. Furthermore, the system must tolerate mechanical errors such as slippage or jamming of the load on the conveyor.

DISCLOSURE OF INVENTION

An object of the present invention is to provide a method and apparatus for improved load tracking on a belt conveyor.

Another object of the present invention is to provide a method and apparatus for load tracking on a belt conveyor having a memory management system and tracking record updating system that minimizes the equipment configuration.

Another object of the present invention is to provide a method and apparatus for load tracking on a belt conveyor wherein synchronization is maintained between data associated with the load stored in a conveyor controller and the location of the load as it is conveyed along the conveyor.

Another object of the present invention is to provide a method and apparatus for load tracking on a belt conveyor that accommodates for slippage of the load on the belt as the load is being conveyed.

A further object of the present invention is to provide a method and apparatus for detecting load jams on a belt conveyor.

In carrying out the above objects and other objects of the invention a method of tracking data associated with a load being conveyed on a belt conveyor between a source station, including a source station load sensor, and a destination station, including a destination station load sensor, includes the steps of:

generating a data record for the load at the source station;

sensing the leading edge of the load by the source station load sensor;

loading the load data record into a controller for controlling the conveyor;

generating a pulse signal having a number of pulses directly proportional to the travel of the belt conveyor;

establishing an expectation window indicating expected arrival of the load at the destination station based on the number of pulse signals;

sensing the leading edge of the load by the destination station load sensor and generating a signal;

communicating the signal to the controller;

comparing the distance between the source and destination station load sensors with the distance the conveyor belt traveled in the time it took the load to travel between the source station and destination station load sensors and detecting any slippage of the load on the belt; and updating the load data record in the controller based on the detected load slippage so that the load data record coincides with the actual location of the load on the conveyor at the destination station.

Apparatus for tracking the load on the belt conveyor between the source station and the destination station includes a record generator for generating a load data record at the source station. A first sensor is located at the source station for sensing the leading edge of the load. A programmable conveyor controller including a comparator in communication with the first sensor and belt conveyor receives and stores the data record when the leading edge is sensed on the conveyor. An encoder produces a pulse signal in direct proportion to the distance travelled by the belt conveyor and is in communication with the conveyor controller. A second sensor in communication with the controller is located at the destination station and senses the leading edge of the load as the load arrives at the destination station. The conveyor controller comparator compares the distance between the first and second sensors, as determined by the number of encoder pulse signals counted, with the length of belt conveyor that was displaced in the time it took the load to travel between the first and second sensors. Any difference is the amount of any slippage of the load on the belt conveyor. Using the detected slippage information, the data record in the controller is then updated to coincide with the actual location of the load on the belt conveyor at the destination station so that the operation at the destination station can be adjusted accordingly.

The objects, features and advantages of the present invention are readily apparent from the following detailed description of the best mode for carrying out the invention when taken in connection with accompanying drawings.

BEST MODE FOR CARRYING OUT THE INVENTION

Figure 1:
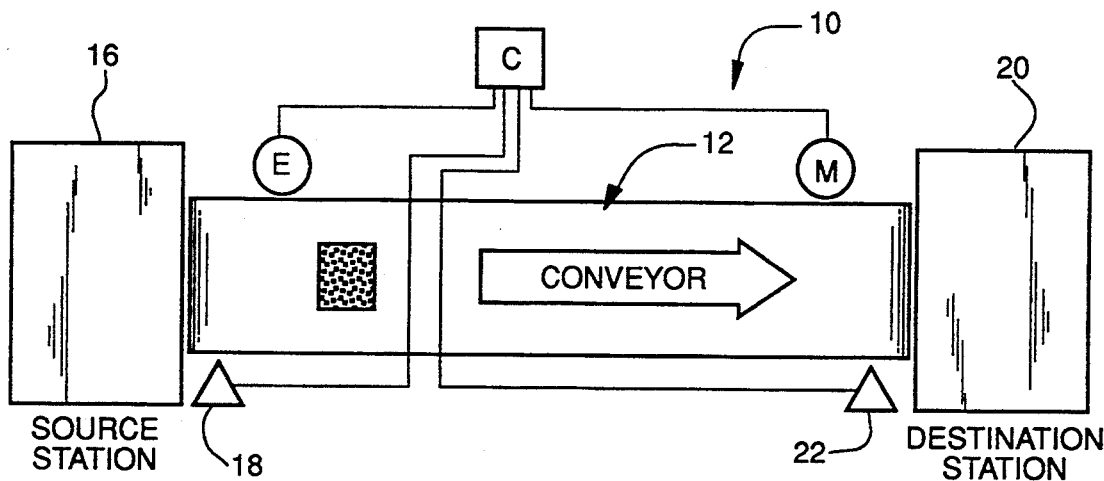
FIG. 1 is a schematic view of a belt conveyor system having load tracking apparatus constructed in accordance with the present invention for conveying a load between a source station and a destination station and tracking a load data record associated with the load stored in the memory of a conveyor controller.

As illustrated in FIG. 1, a belt conveyor system is generally indicated by reference numeral 10 and includes one or more conveyors to transport a load from one location to another. As is hereinafter more fully described, belt conveyor system 10 detects and accommodates for any slippage of the load on the conveyor and maintains synchronization between data associated with the load in a programmable conveyor controller and the location of the load on the conveyor.

With reference to FIG. 1, a belt conveyor 12 is driven by a motor M, which is controlled by a controller C. An encoder E is mounted to a shaft of the conveyor idler pulley and produces a pulse signal which is communicated to the controller C. The period of these pulses is directly proportional to the speed of the belt conveyor such that the conveyor travels a fixed distance in the time between the occurrence of two adjacent pulses.

Pulse signals from the encoder E are used to measure belt conveyor 12 travel during a given time period. For example, if the belt conveyor 12 is 20 feet long and the encoder E produces a pulse for every two inches of belt conveyor travel, the encoder will produce 120 pulses while a load is conveyed from one end of the conveyor to the other given there is no slippage of the load on the conveyor. The number of pulses produced depends only on the motion of the belt 12. The number of pulses produced is not affected by any starting or stopping of the belt 12.

At one end of the belt 12 is a source station 16 including a first or source station load sensor 18. At the other end of the belt 12 is a destination station 20 including a second or destination station load sensor 22. Sensors 18,22 detect the loads as they pass, or are in view of the sensors while being conveyed on the belt conveyor 12. The theoretical distance the belt conveyor 12 travels while conveying a load between the sensors 18,22 can be described in terms of the number of pulses the encoder E will produce during movement of the front edge of the load from the first sensor 18 to the second sensor 22.

The controller C associates a data record in its memory for each load on the belt conveyor 12. This data, or load record, contains the data to be tracked with the load and information about the position of the load on the belt conveyor 12.

The information to be tracked with the load is communicated to the controller C by one or more of several means. The data may be gathered from the load directly using record generators such as bar code readers, radio frequency tag readers, weigh scales, profiling sensors, vision systems, operator keyboards, or other devices connected to and in communication with the controller C and the controller stores the data in a load record created for the load in the controller's memory.

Figure 2:
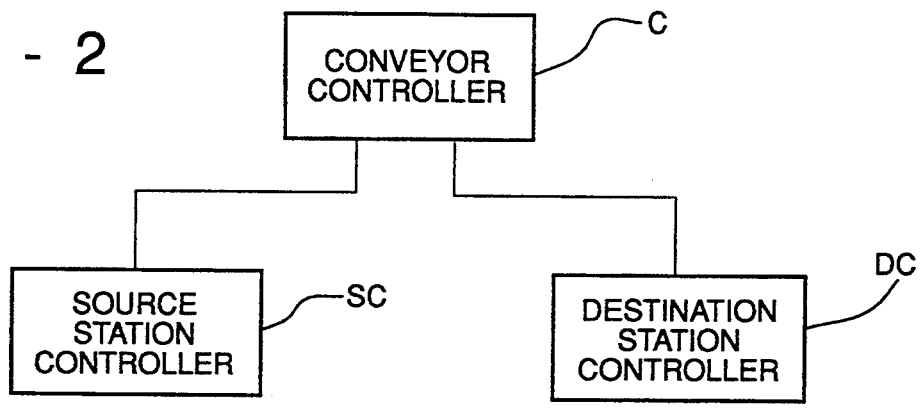
FIG. 2 is a flow diagram illustrating data interfacing between a source station controller, a destination controller and a conveyor controller in one arrangement of the invention.

With reference to FIG. 2, it may be the case that the belt conveyor 12 carries items away from a piece of automated equipment such as a carton sealer, machining center, or inspection station. In this case, the automated equipment can be set up to include a source station controller SC and a destination station controller DC. The source station controller SC communicates data associated with the load to the controller C when the load is placed on the belt conveyor 12. The conveyor controller C stores the data in the load record for the load in the conveyor controller's memory and relays the data to the destination station controller DC upon the arrival of the load at the destination station.

Figure 3:
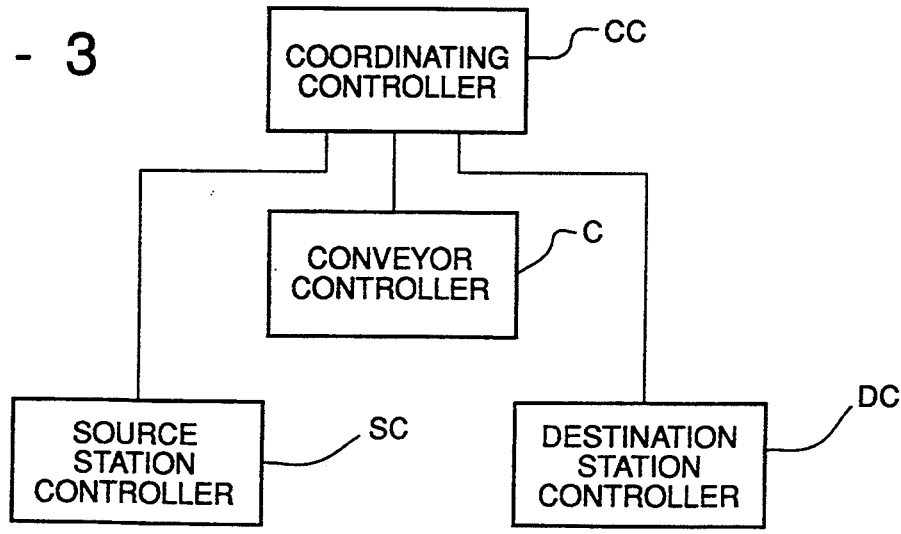
FIG. 3 is a flow diagram illustrating data interfacing between a source station controller, destination station controller, conveyor controller and coordinating controller in another arrangement of the invention.

With reference to FIG. 3, it may be the case that belt conveyor 12 is part of a distributed automated system including several pieces of automated equipment connected to a centralized coordinating controller CC. In this case, the coordinating controller CC keeps the bulk of the data relating to the load received from the source station controller SC and communicates an ID tag or license plate datum to the conveyor controller C when the load is placed on the conveyor 12. This communicated information is the handle the conveyor controller C uses to refer to the load and the information the coordinating controller CC uses to refer to the data associated with the load.

In a distributed system, there is an alternative to the coordinating controller CC generating the communicated information or handle associated with the load. The conveyor controller C itself can generate the handle and communicate the identifier to the coordinating controller CC.

The load record is generated and stored in the conveyor controller memory when the lead edge of the load on the belt conveyor 12 passes the first sensor 18. All of the communication between controllers, SC, C, CC required to establish the data in the load record occurs at this time. If the necessary communication is unsuccessful, the conveyor controller C generates a load record with dummy data. The conveyor controller C tracks this dummy data record with the load until the load reaches the destination station 20. When the load reaches the destination station, the conveyor controller uses the dummy record to communicate the loss of information condition for the load. The destination station 20 handles the load commensurate with this condition.

Besides the load data, the conveyor controller C maintains location or position data about the load in the load record. This data is the distance between the lead edge of the load and the lead edge of a previous load on the belt conveyor 12 determined by the number of pulses generated by encoder E during the time period between the sensing of the lead edge of the loads by sensor 18 as the loads pass thereby. If there is no prior load on the belt conveyor 12, this distance is the distance between the load sensors 18,22.

A conveyor tracking model is established and consists of an ordered list of load records corresponding to the loads on the belt conveyor 12 as hereinafter described with reference to FIG. 6. The list is consecutively ordered in a linked list management scheme according to the order of the loads on the belt conveyor 12. The conveyor controller C maintains this list in its memory.

The conveyor controller C stores the position of the belt conveyor 12 as determined from the encoder E when the source load sensor 18 detects the lead edge of a load. Each time the source station load sensor 18 detects a lead edge of a load, the conveyor controller C adds a load record associated with that load to the tracking model. The conveyor controller C then establishes a data field for the load record by receiving input from record generators as previously described. The conveyor controller C also establishes a distance field for each load record by using the smaller of the distance between loads computed from pulse signals or the distance between the sensors.

For example, when a first load is introduced upon the belt conveyor 12, a first load record is created and the distance field contains an encoder count associated with the distance between the sensors 18,22. A counter in the conveyor controller C begins counting pulses from zero. This load record is entered into the tracking model of the conveyor controller C at the top of a list.

When a second load is introduced upon the belt conveyor 12, a second load record is created. The distance field value for the second load is a count of pulses corresponding to the distance determined by pulse signals from the lead edge of the first load to the lead edge of the second load. The counter for the second load is set and begins counting pulses from zero. This load record is entered into the tracking model as the second entry of the list.

The controller C handles subsequent loads entering the conveyor in a manner similar to the handling of the second load. The distance field of each record thus holds the distance from the lead edge of that load to the lead edge of the load in front of it.

Controller operation is simplified as conveyor controller C continually operates on the first load in the tracking model. As soon as a record becomes the first record in the model, the conveyor controller C decreases the value in the distance field of the load record each time the encoder E sends a pulse signal. The first load on the conveyor 12 has a load record distance field value corresponding to the theoretical distance from the lead edge of the load to the destination station load sensor 22. As the load moves, the distance field counts down so that the distance field always contains a theoretical value corresponding to the distance from the lead edge of the load to the destination station load sensor 22.

When the distance field is greater than a design specific tolerance value, the controller C treats any signals from the second sensor 22 as error signals. These signals correspond to false triggers or loads which have been moved out of position by external forces. In these instances where there is an unexpected load detected, the controller C does not have a valid load record for these signals. The system responds to the detection of an unexpected load by generating and tracking a record with an "unexpected load" data field. This dun%my data can be communicated to other downstream systems such as the destination station controller DC.

When the distance field of the first load record in the tracking model counts down to a value within the design specific tolerance, the controller C calculates an expectation window of belt conveyor 12 length in which to expect a load at the second sensor 22. This expectation window length, as determined from pulses, is the lessor of two limit values. The first limit is the maximum allowed slippage of the load on the belt conveyor 12 for the specific system. The second limit is the value of the distance field of the second load record in the tracking model less the system specific minimum tolerance between loads. The controller compares and selects the lower of these two values for the expectation window length to allow more tolerance for slippage when the loads are spaced far apart and less tolerance when they are spaced close together.

While the expectation window is open, the controller C expects to receive a signal from the destination station load sensor 22. When this signal appears, the controller C resets the expectation window and communicates the data field of the first load record in the tracking model to a downstream system controller. If the expectation window expires without the signal appearing, the controller C can be programmed to implement a jam counter. The jam counter causes a jam fault signal when a system specific number of consecutive missed loads occurs. This signal is used to stop the system and to alert the operator of the failure. If one load is out of its expectation window and the next one is in, the jam counter resets.

Figure 4:
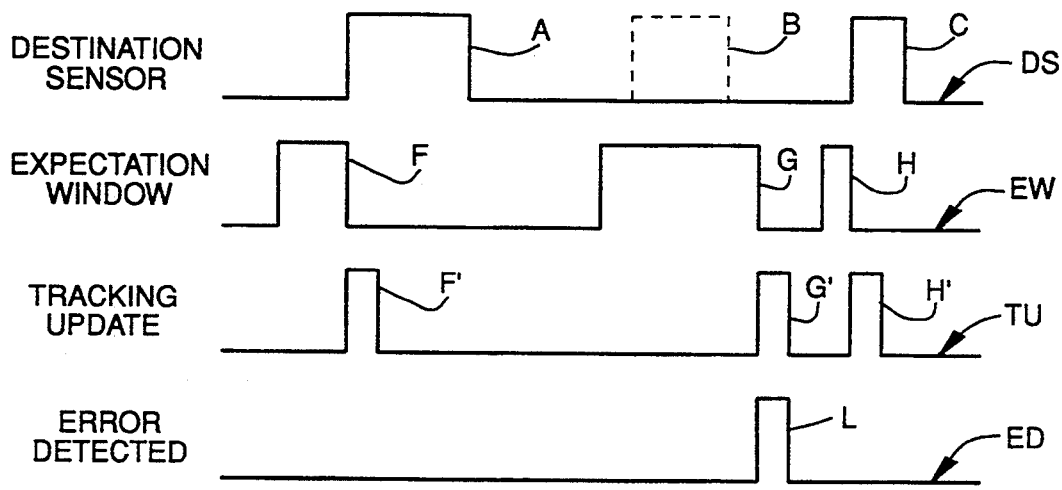
FIG. 4 is a timing diagram illustrating the relationship between load sensing at the source station, expected load arrival at the destination station, updating a load tracking model and error detection at the destination station.

When the distance field for the first load record has counted all the way down to zero, the tracking model is updated to move the second load record to the top of the list. At this point the lead edge of the second load is a distance from the destination station load sensor 22 corresponding to the value in the distance field of the load record. The timing diagram of FIG. 4 illustrates this operation through the use of lines DS, EW, TU and ED.

Line DS represents the signal presented to the controller C by the destination sensor. The base line represents a time period in which no load is in view of the sensor. A step represents a time period in which a load is passing the sensor. Steps A and C represent two loads passing the destination sensor. Phantom step B represents a signal the controller C expected, but where no load was viewed by the destination sensor.

Line EW represents the expectation window signal generated by the controller C as hereinabove described. These windows represented by steps F, G, & H are the time periods during which the controller C expects to receive a signal from the destination sensor for three successive loads.

Line TU represents the load tracking update operations in the conveyor controller C represented by steps F', G' and H'. Line ED illustrates the occurrence of a load tracking error condition illustrated by step L generated by the controller C as a result of an unexpected sequence of signals wherein the destination sensor does not produce an expected signal during the expectation window G.

In time sequence, FIG. 4 illustrates the proper tracking of two loads and the detection of a missing load on the conveyor at the destination station by the following events:

1. The controller C establishes an expectation window as previously described. This is illustrated by the first step F on line EW.
2. When a load comes in view of the destination sensor, as represented by step A, the controller C responds by updating the tracking model to remove the load record (pulse F' on TU) and ending the expectation window (end of pulse F on EW).
3. As the conveyor continues to move, the controller C establishes a second expectation window as illustrated by the second step G on line EW. The controller C is expecting a load at the destination station.
4. The phantom step B on line DS, represents the point in time where the controller C expected to receive a signal from the destination sensor.
5. The conveyor continues to move and the controller C measures the maximum allowed expectation window. When the maximum is reached, the controller eliminates the expectation window, not having received the expected signal from the destination sensor.
6. The controller C responds to the elimination of the expectation window not having received the expected signal from the destination sensor by updating the tracking model to remove the load record (second step J on line TU) and producing an error signal (step L on line ED).
7. The conveyor continues to move and steps 1 and 2 are repeated to track the next load to the destination station.

The case hereinabove described covers tracking of a load on a single belt conveyor 12 between a source station 16 and a destination station 20. The same tracking concepts can be applied to systems having multiple conveyor segments placed end-to-end. An arrangement of such a system is referenced 10' and is shown in FIG. 5.

Figure 5:
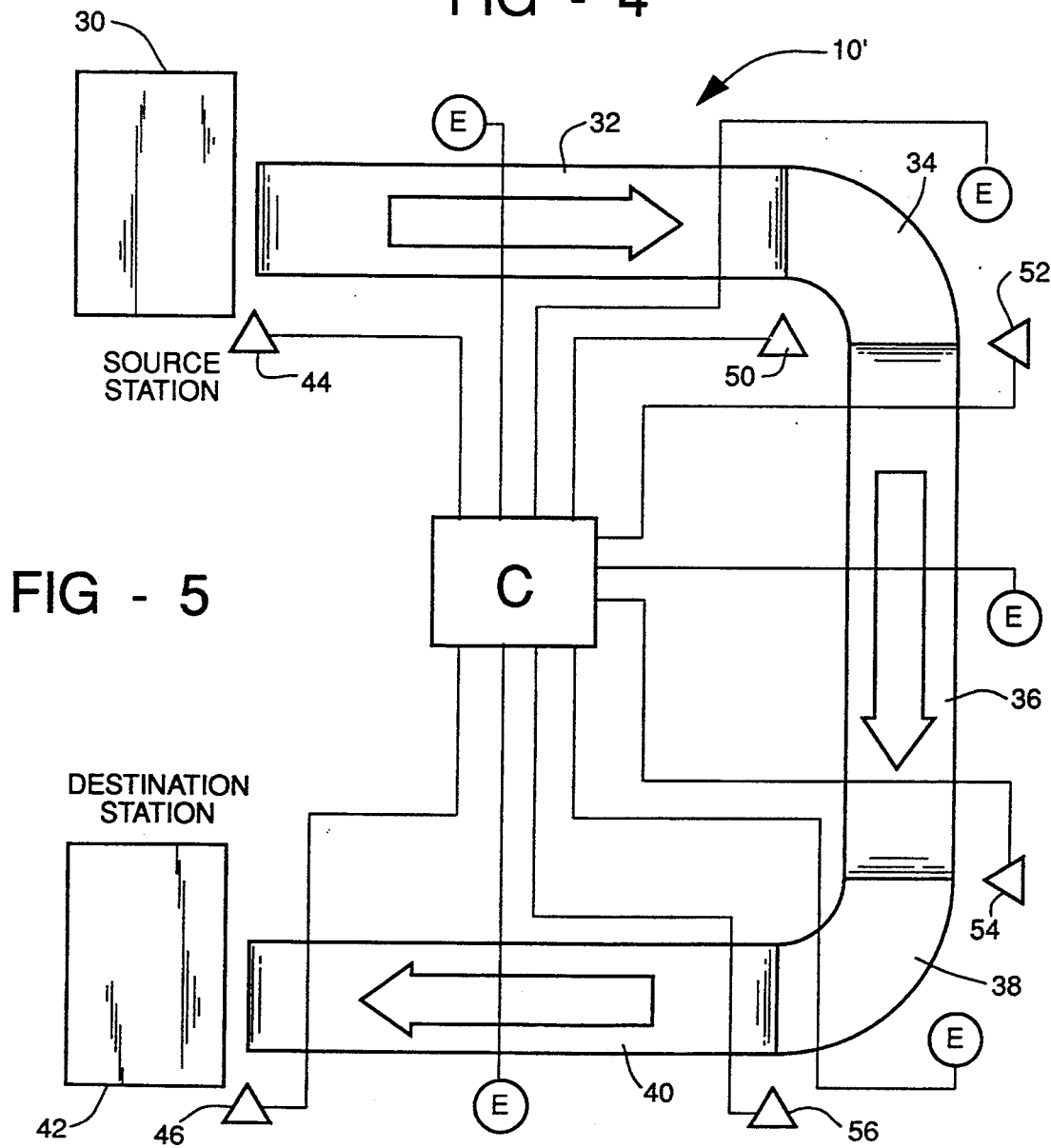
FIG. 5 is a schematic view of a multiple segment belt conveyor system having load tracking apparatus constructed in accordance with the present invention.

With reference to FIG. 5, a source station 30 feeds loads to a system of five conveyor segments 32,34,36,38,40 and destination station 42 receives them. A source station load sensor 44 is provided at source station 30 and a destination station load sensor 46 is provided at destination station 42. An encoder E is attached to each conveyor section 32,34,36,38,40 respectively and a sensor 50,52,54,56 is located at each junction between two conveyor segments.

The system 10' maintains a separate tracking model as hereinabove described for each conveyor segment. Each segment 32,34,36,38,40 is defined by an interval of belt conveyor between two load sensors 44 and 50; 50 and 52; 52 and 54; 54 and 56; and 56 and 46. The tracking model loading operation for the first conveyor segment 32 is identical to the loading operation hereinabove described for a single conveyor system.

At the point where the load reaches the transition from one conveyor segment to the next, i.e. segment 32 to segment 34, the conveyor controller C must transfer the load record from the tracking model associated with the first conveyor segment 32 to that associated with second conveyor segment 34. This transfer operation occurs by simultaneously unloading the tracking model associated with the first conveyor segment 32 and loading the tracking model into the load record associated with the second conveyor segment 34 when the lead edge of the load is sensed by the sensor 50 at the transition between the two conveyor segments. In this system, sensor 50 is performing both the unload and load operation associated with the data record.

When the load reaches destination station 42, the controller C transmits the load record data field to the destination controller DC or the coordinating controller C synchronized with the physical arrival of the load at the destination station 42.

The controller C maintains an ordered list of load records in memory as a linked list memory scheme. In this scheme, load records are stored randomly in the controller's available memory. For each load record in the conveyor load tracking model, the controller C maintains a pair of pointer values in memory that point to the memory address of the first and last load records for a particular conveyor's load tracking model. A pointer is a memory location containing the address of another memory location. Thereby the controller program C can always get a first or last record associated with a conveyor segment by examining one of these two pointers.

The structure of the load record contains a data field which links all of the records in the conveyor tracking model together. This field is a pointer, or memory location containing the memory address of the next record in the list. Thereby the load records can be linked to form a list that is ordered from first to last for the entire system.

Figure 6:
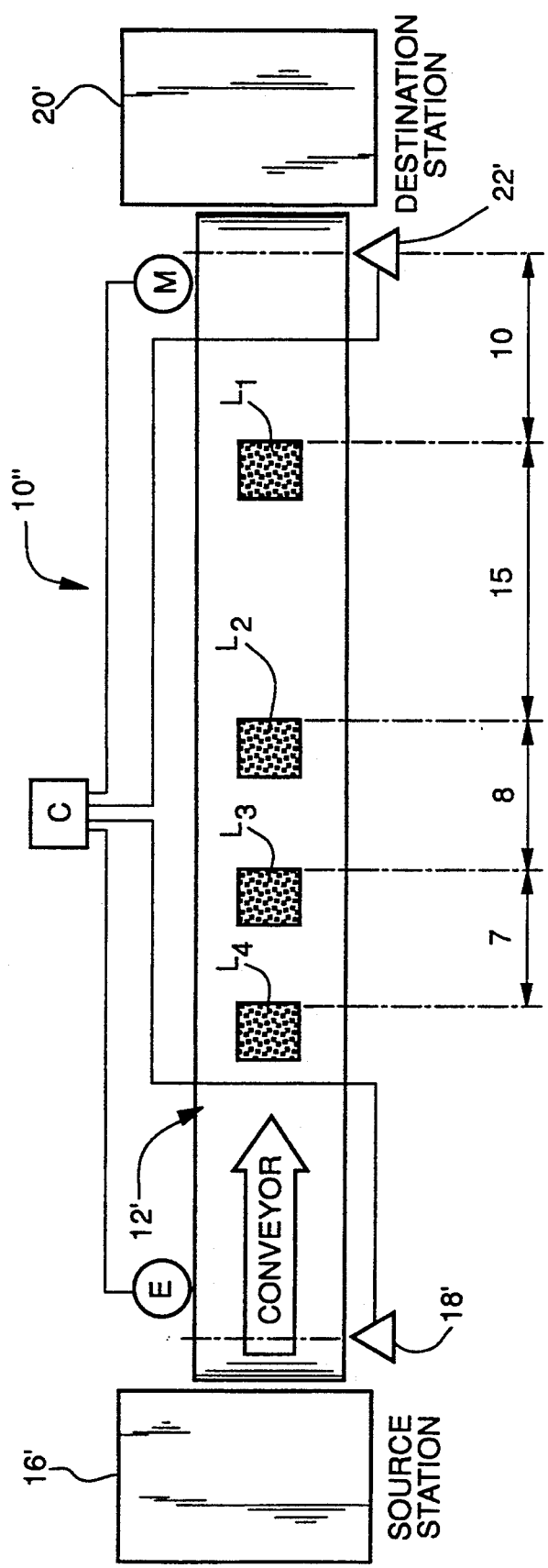
FIG. 6 is a schematic view of the belt conveyor of FIG. 1 illustrating the physical layout of loads on the conveyor.

With reference to FIG. 6 and the following example, a first data record is at address 5 so the pointer to the first load has a value of 5. The last record is at address 17 so the pointer to the last load contains a value of 17. The second data record is at address 11 so the next data record pointer for the first record is 11. The third load record is at address 23 so the next record pointer of the second load record has a value of 23. The fourth and last load record is at address 17 so the next record pointer of the third load record has a value of 17.

| EXAMPLE: TRACKING MODEL MEMORY | | | |
|---|---|---|---|
| Address | | | |
| 0 | 5 | Pointer to first load | |
| 1 | 17 | Pointer to first load | |
| 2 | | | |
| 3 | | | |
| 4 | | | |
| 5 | 1 | DATA 1 | |
| 6 | 10 | DIST 1 | Load Record |
| 7 | 11 | NEXT RECORD | For First Load |
| 8 | | | |
| 9 | | | |
| 11 | 2 | DATA 2 | |
| 12 | 15 | DIST 2 | Load record |
| 13 | 23 | NEXT RECORD | for second load |
| 14 | | | |
| 15 | | | |
| 16 | | | |
| 17 | 4 | DATA 4 | |
| 18 | 7 | DIST 4 | Load record |
| 19 | 0 | NEXT RECORD | for fourth load |
| 20 | | | |
| 21 | | | |
| 22 | | | |
| 23 | 3 | DATA 3 | |
| 24 | 8 | DIST 3 | Load record |
| 25 | 17 | NEXT RECORD | for third load |
| 26 | | | |
| 27 | | | |

FIG. 6 corresponds with the above example and illustrates a conveyor 10″ with four spaced loads $L_1$, $L_2$, $L_3$, and $L_4$ on it. Distances between the loads are represented by the values 10, 15, 8 and 7 expressed by the number of pulses between the loads. These values correspond with values in each load record distance field in the controller C. The first load $L_1$ distance is the distance between the first load and the destination sensor 22.

Although individual load records may be scattered through the controller memory in no particular order, the controller C is able to find the first load record using the special first load pointer. When the controller C finds that record, it can read the next record pointer to find the next record in the list. When the controller reads the next record, that record points to the third, and so on. By this method, the controller can read the entire list from front to back as if it were actually stored in consecutive locations in memory.

Empty memory space is managed in a manner similar to a conveyor tracking model. An empty record pointer memory location contains the address of the first empty record. This record's next record pointer field contains the address of the next empty record. This continues or all of the empty records, thereby linking all of the empty records into a list.

Controller C also has a pointer that points to the last record in the list so it can find that record directly. When a new load enters the system, the program locates empty memory space and places the new load record in it. By modifying the last load record in the list, the controller can append the new record to the list.

When a new load is introduced to the system 10′, 10″, 10‴ the controller C removes an empty record from the empty record list and stores the data associated with the new load in it. To enter the load record into the tracking model, the controller C changes two pointers. The controller C finds the last load record in the list and changes its next record pointer to point to the new record. Finally, the controller C changes the tracking model last load pointer to point to the new load record.

When a load record is to be removed from the front of the list, an unlinking process is followed. The controller C finds the first and second load records by following the pointers as described above. The controller then changes the tracking model's first load pointer to point to the second load record.

Since the load records never move once they are stored in the controller memory, processor requirements are minimized. The only load records acted on are the first and last load records in the tracking model.

While the best mode for carrying out the invention has been described in detail, those familiar with the art to which this invention relates will recognize various alternative designs and embodiments for practicing the invention as defined by the following claims.

What is claimed is:

1. A method of tracking data associated with a load being conveyed on a belt conveyor between a source station including a source station load sensor and a destination station including a destination station load sensor comprising the steps of:
   generating a load record for the load at the source station;
   sensing the leading edge of the load by the source station load sensor;
   loading the load record into a programmable controller and establishing a data field for controlling the conveyor;
   generating a pulse signal having a number of pulses directly proportional to the travel of the belt conveyor;
   establishing a distance field for the load record comprising the smaller of the distance between the load and any preceding load on the belt conveyor computed from pulse signals and the distance between the load and the destination station load sensor;
   establishing an expectation window of belt conveyor length indicating expected arrival of the load at the destination station based on the number of pulse signals;
   sensing the leading edge of the load by the destination station load sensor and generating a signal;
   communicating the signal to the controller;
   comparing the distance between the source and destination load sensors with the distance the conveyor belt traveled in the time it took the load to travel between the source station and destination station load sensors and detecting any slippage of the load on the belt; and
   updating the data record in the controller, based on the detected load slippage, to coincide with the actual position of the load on the conveyor at the destination station.

2. The method of claim 1 wherein establishing said expectation window includes the steps of:
   comparing the maximum allowed value for slippage of the load on the belt conveyor to the value of the distance field between loads; and
   selecting the lesser value.

3. The method of claim 2 including the step of:
   adjusting the duration of the expectation window based on the load spacing on the conveyor.

4. The method of claim 3 including the step of:
   increasing the duration of the expectation window for greater load spacing and decreasing the duration of the expectation window for lesser load spacing.

5. The method of claim 1 including the step of:
   removing the load record associated with the load from the conveyor controller when the load is not sensed by the second sensor within the duration of the expectation window.

6. The method of claim 1 further including the step of:
   ordering a list of load records in the conveyor controller corresponding to loads on the conveyor.

7. The method of claim 6 wherein ordering said list of load records comprises consecutively listing said load records in a linked list memory management scheme.

8. The method of claim 7 further including the step of:
   adding a load record to the list when the lead edge of a load is sensed by the source station load sensor.

9. The method of claim 7 further including the step of:
   removing a load record from the list when the load reaches the destination station.

10. The method of claim 1 further including the steps of:
    counting expectation windows within which loads are not detected;
    generating a load jam status condition when a threshold count is reached; and communicating said load jam status to auxiliary processing means.

11. A method of tracking data associated with a load being conveyed on a multiple segment belt conveyor between a source station including a source station load sensor, a destination station including a destination station load sensor and a junction load sensor between each of said multiple segments comprising the steps of:
generating a load record for the load at the source station;
sensing the leading edge of the load by the source station load sensor;
loading the load record into a programmable controller and establishing a data field for controlling the initial segment of the belt conveyor;
generating a pulse signal having a number of pulses directly proportional to the travel of the initial conveyor segment;
establishing a distance field for the load record comprising the smaller of the distance between the load and any preceding load on the belt conveyor computed from pulse signals and the distance between the load and the junction load sensor at the first junction;
establishing an expectation window of belt conveyor length indicating expected arrival of the load at a first junction between conveyor segments based on the number of pulse signals;
sensing the leading edge of the load at the first junction and generating a signal;
communicating the signal to the controller;
comparing the distance between the source station load sensor and first conveyor junction with the distance the conveyor belt traveled in the time it took the load to travel between the source station and first conveyor junction and detecting any slippage of the load on the belt;
updating the data record in the controller based on the detected load slippage to coincide with the actual location of the load on the initial conveyor segment at the first conveyor junction;
associating the data record in the controller with the sequentially next conveyor segment as the load is transferred to the next conveyor segment;
continually tracking and synchronizing the load record and physical location of the load at each junction of the conveyor segments; and
removing the data record from the controller when the load reaches the destination station.

12. The method of claim 11 wherein establishing said expectation window includes the steps of:
comparing the maximum allowed value for slippage of the load on the belt conveyor to the value of the distance field between loads; and
selecting the lesser value.

13. The method of claim 12 further including the step of storing load records in memory as a linked list memory scheme.

14. The method of claim 13 further including the step of:
maintaining a pair of pointer values in memory that point to a memory address of first and last load records.

15. The method of claim 14 including the step of:
assigning pointer values to each load on the belt conveyor such that consecutive loads have a pointer value that corresponds to a succeeding load on the belt conveyor.

16. The method of claim 15 including the step of:
listing the load records from the first load to the last load using pointer values.

17. The method of claim 16 including the steps of:
removing a first pointer value associated with a first load record when the associated load reaches a conveyor junction; and
updating the list such that the second pointer value and associated second load record becomes the first load record in the controller memory.

18. Apparatus for tracking a load and a load record associated with the load on an endless belt conveyor between a source station and a destination station comprising:
a record generator for generating a load record at the source station;
a first sensor located at the source station for sensing the leading edge of the load;
a conveyor controller including a comparitor in communication with said first sensor and conveyor; said controller receiving and storing said load record as a data field including a distance field when said leading edge is sensed by said first sensor on the conveyor; said controller being a programmable device programmable to perform a load tracking function;
an encoder producing a pulse signal directly proportional to the distance travelled by the belt conveyor in communication with said controller; and
a second sensor located at the destination station for sensing the leading edge of the load; said second sensor being in communication with said controller; said comparitor comparing the distance between the first and second sensors with the distance the conveyor belt travelled in the time it took the load to travel between the first and second sensors thereby detecting any slippage of the load on the belt conveyor whereby the load record in the controller is updated to coincide with the actual position of the load on the belt conveyor at the destination station.

19. Apparatus as in claim 18 wherein said belt conveyor system is a multiple segment belt conveyor and wherein said apparatus further includes a plurality of said sensors, each being located at a junction between conveyor segments and being in communication with said controller, said sensors sensing the leading edge of the load at a junction;
said apparatus also including a plurality of said encoders, one said encoder for each conveyer segment, said encoders being in communication with said controller whereby the data records in said controller is updated to coincide with the actual position of the load on the belt conveyor at each junction between conveyor segments.

20. Apparatus as in claim 19 wherein said first and second sensors are photoeyes.

* * * * *